(12) United States Patent
Paule et al.

(10) Patent No.: US 11,608,965 B2
(45) Date of Patent: Mar. 21, 2023

(54) COVER ELEMENT FOR SENSORS AND METHOD FOR PRODUCING THE COVER ELEMENT

(71) Applicant: Magna Exteriors GmbH, Sailauf (DE)

(72) Inventors: Thomas Paule, Glattbach (DE); Frank Weimer, Wertheim (DE); Marc Huttenlocher, Nürtingen (DE)

(73) Assignee: MAGNA EXTERIORS GMBH, Sailauf (DE)

( * ) Notice: Subject to any disclaimer, the term of this patent is extended or adjusted under 35 U.S.C. 154(b) by 0 days.

(21) Appl. No.: 17/737,210

(22) Filed: May 5, 2022

(65) Prior Publication Data
US 2022/0357021 A1    Nov. 10, 2022

(30) Foreign Application Priority Data

May 6, 2021    (DE) .......................... 102021204629.0

(51) Int. Cl.
| | |
|---|---|
| *F21V 19/00* | (2006.01) |
| *F21V 29/90* | (2015.01) |
| *F21V 23/00* | (2015.01) |
| *F21V 23/06* | (2006.01) |
| *H01Q 1/42* | (2006.01) |
| *F21Y 115/10* | (2016.01) |

(52) U.S. Cl.
CPC ...... *F21V 19/0035* (2013.01); *F21V 19/0075* (2013.01); *F21V 23/005* (2013.01); *F21V 23/06* (2013.01); *F21V 29/90* (2015.01); *H01Q 1/42* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2017/0036594 A1* | 2/2017 | Roberts | .................. G09F 13/06 |
| 2021/0100065 A1* | 4/2021 | Lee | ...................... H05K 1/0203 |

FOREIGN PATENT DOCUMENTS

| | | |
|---|---|---|
| DE | 102006046436 B3 | 4/2008 |
| DE | 102013016667 A1 | 7/2014 |
| DE | 102015004204 A1 | 8/2015 |
| DE | 102016007119 A1 | 2/2017 |
| DE | 102017214129 A1 | 2/2019 |
| DE | 102018220997 A1 | 6/2020 |
| WO | WO-2013044636 A1 * | 4/2013 ............... F21K 9/13 |

OTHER PUBLICATIONS

European Search Report from the European Patent Office for related European Patent Application No. 22170504.9 dated Oct. 14, 2022, 7 pages.
German Search Report for DE102021204629.0 dated Mar. 25, 2022, 5 pages.

* cited by examiner

*Primary Examiner* — Elmito Breval
(74) *Attorney, Agent, or Firm* — Dickinson Wright PLLC

(57) ABSTRACT

The invention relates to a cover element having a housing of a film that is formed and moulded between a front plate and a carrier plate and is used to represent multidimensional structures, the carrier plate being connected on the rear side to a heating plate, characterized in that the housing consists of an annular housing base and an annular housing front, and a circuit-board ring having LEDs and plugs is installed in the housing base.

17 Claims, 4 Drawing Sheets

COVER ELEMENT FOR SENSORS AND METHOD FOR PRODUCING THE COVER ELEMENT

CROSS-REFERENCE TO RELATED APPLICATIONS

This application claims priority to German Patent Application No. DE 102021204629.0 filed May 6, 2021, the entire disclosure of which is incorporated herein by reference.

TECHNICAL FIELD

The invention relates to a cover element having a housing of a film that is formed and moulded between a front plate and a carrier plate and is used to represent three-dimensional structures, the carrier plate being connected on the rear side to a heating plate.

The invention also relates to a method for producing the cover element.

BACKGROUND

This section provides information related to the present disclosure which is not necessarily prior art.

Owing to their function, radar sensors for the detection of a driving environment need to be fitted at highly design-relevant positions, particularly inside the front of the vehicle or the rear of the vehicle. Because of the currently very different frequency ranges of near-field and far-field radar sensors, different situations are encountered for their integration:

Radar sensors are operated in the frequency range between 76 and 81 GHz. In this frequency range, with some paint colours (for example metallic silver) which have a high concentration of metal particles, placement behind painted plastic surfaces causes high reflections. Integration of these sensors behind surfaces painted in the bodywork colour is therefore substantially avoided.

Some manufacturers favour clearly visible sensors. Often, the sensors are placed in an opening in the lower part of the bumper. The other approach is substantially inconspicuous installation, which makes it necessary to cover the radar sensor. One common installation point of these covered sensors is the region of the radiator grille. However, the radiator grille is an essential configurational element with a high recognition factor for a brand. Such a radar covering, known as a radome, should ideally meet the requirements of the vehicle design and be as neutral as possible in respect of the wave propagation. This may lead to conflicting demands which prevent optimal installation in any regard.

If radar devices are used under ambient conditions with temperatures around and below freezing point, ice may be formed on the radome. Because of the additional ice layer on the radome, unimpaired operation of the radar device is not possible or is only limitedly possible.

Radomes are coverings of transmitters and/or receivers of electromagnetic radiation, for example of radar devices and/or their antennas. A radome is intended to prevent interference, for example with the radar device, by environmental effects. Radomes consist of a material, usually plastic, through which the radiation in question, for example radar radiation, can be emitted and reflected radar radiation can be received.

DE 10 2013 016 667 A1 discloses a radome in the form of a multilevel cover element, at least a first level being formed from a transparent plastic. A boundary layer, which is formed by a scattering structure and a metallic structure, is formed between the first level and a second level. The scattering structure is locally interrupted by the metallic structure. The radome may be illuminated by means of light introduced into the scattering layer.

DE 10 2015 004 204 A1 discloses a radome which has a front side and a rear side and comprises at least one coupling structure for introducing light into the radome. The radome furthermore has at least one heating element. The radome represents a vehicle manufacturer emblem. The symbol is formed by a metallic structure. Here, a vehicle design with a consistent performance of the radar device is sought. In this case, it should be noted that this metallic structure, at least when it is in the region of the radar radiation, must be so thin that it is still radar-transmissive. For example, indium is vapour-deposited in only a few μm onto the radome.

SUMMARY

This section provides a general summary of the disclosure, and is not a comprehensive disclosure of its full scope or all of its features.

It is an object of the invention to provide an improved cover element which comprises the advantages of illumination and heating but does not hinder the radar transmission.

The object is achieved by a cover element having a housing of a film that is formed and moulded between a front plate and a carrier plate and is used to represent three-dimensional structures, the carrier plate being connected on the rear side to a heating plate, wherein the housing consists of an annular housing base and an annular housing front, and a circuit-board ring having LEDs and plugs is installed in the housing base.

The advantage of this configuration is that all the electrical component parts and their leads are located inside the housing, that is to say inside an annular region. The housing therefore covers these component parts outwards. The central region of the cover element remains unaffected by component parts which detrimentally influence transmission of radar beams.

The light of the LEDs is introduced into the carrier plate by means of an optical unit, this introduction taking place precisely inside the ring structure of the housing and thus not being externally perceived and also not interfering with the radar beams.

It is in this case advantageous for the optical unit to be part of the carrier plate and thus to be straightforwardly producible.

The optical unit is a cone which extends from the carrier plate towards the LEDs.

It is advantageous for the film to extend towards the optical unit in the region of the optical unit at an angle relative to the plane of the film. In this way, the light of the LEDs is introduced optimally into the carrier plate and can be distributed in the light guide structure of the carrier plate.

The light is in this case guided between the film and the upper side of the heating plate in the carrier plate as a light guide.

In order to output the light, the total internal reflection is interrupted by selection of the material of the upper side of the heating plate or by installation of geometrical structures on the heating plate, and the light is partially output through the film and the front plate.

The fastening of the circuit-board ring is carried out by means of pins formed on the heating plate. This fastening lies outside the central region of the cover element, so that here again penetration by radar signals is not hindered.

The object is furthermore achieved by a method for producing a cover element, characterized by the following steps:
- in a first step, the film preformed by the HPF method is placed in the first cavity of the two-component tool and is transparently overmoulded,
- in the second step, the heating plate is placed in the second tool half of the injection-moulding tool,
- the tool is rotated. The transparent material of the carrier plate is then injection-moulded between the first component part and the heating plate,
- in the third step, the injection-moulded assembly is hard-lacquered or immersed in a hard lacquer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION OF THE EXAMPLE EMBODIMENTS

Figure 1:
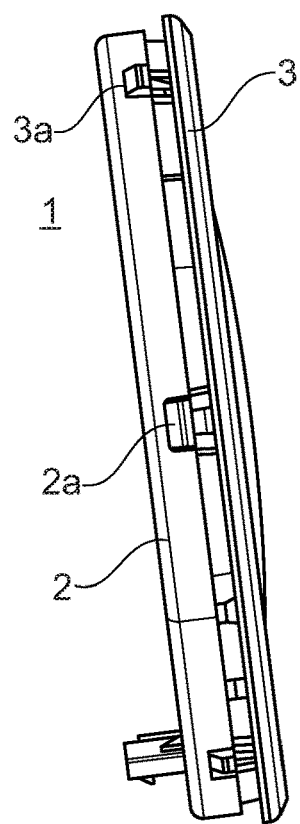
FIG. 1 shows a side view of a cover element.

In FIG. 1, the cover element 1 is represented from the side. The cover element 1 comprises a housing, which consists of a housing front 3 and a housing base 2. The two annularly configured housing parts are connected to one another by means of hooks 3a, which are clipped into slots 2a. As may also be seen from FIG. 3, a plurality of hooks 3a are in this case arranged distributed along the radius of the housing front 3. The housing base 2 likewise comprises the corresponding slots 2a over its radius.

Figure 3:
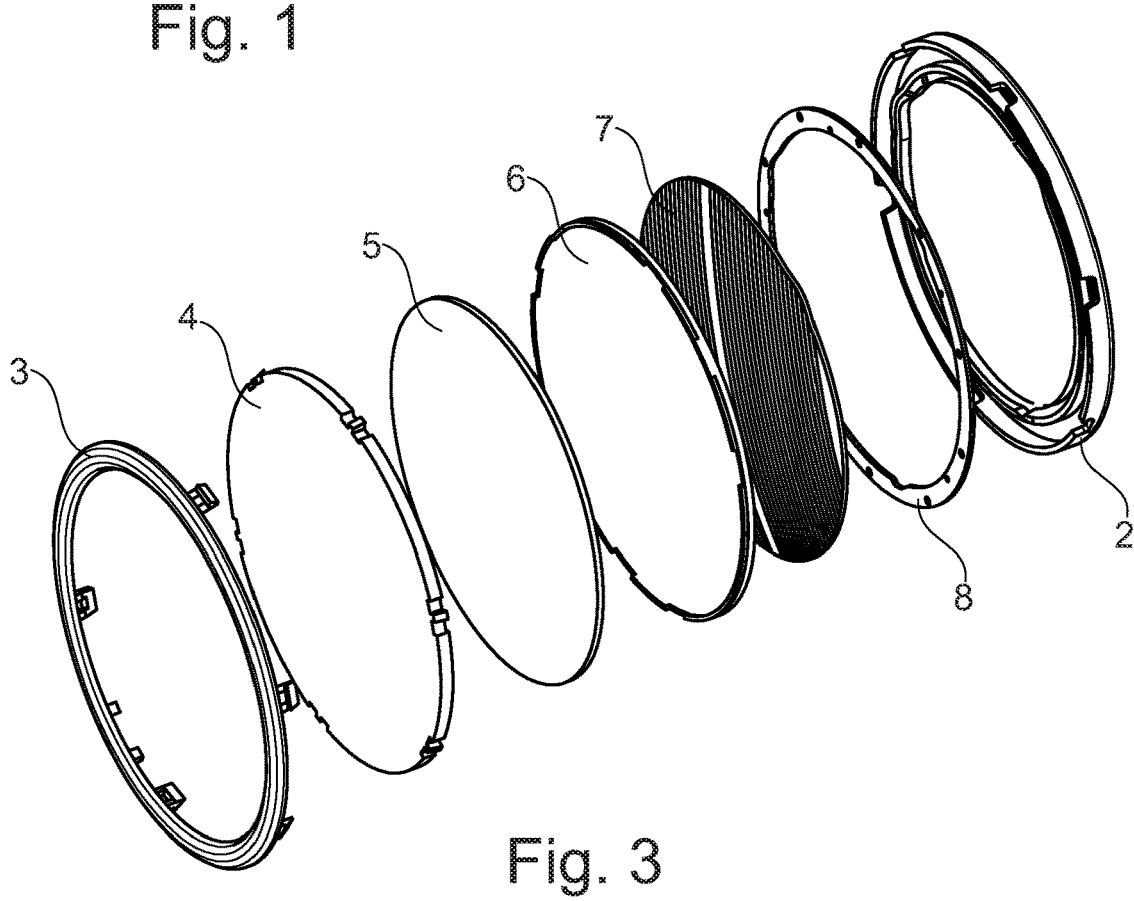
FIG. 3 is an exploded representation of the cover element.

FIG. 3 shows the overall construction of the cover element 1 with all the individual layers, some of which are produced directly connected to one another.

As observed from outside the vehicle, the housing front 3 together with a front plate 4 may be seen. The front plate 4 covers the film 5, which is a metallized or partially metallized film. The film 5 may also be provided partially or fully with a paint application. The film 5 is supported by a carrier plate 6, on the side of which facing towards the inside of the vehicle a heating plate 7 is applied. The components: front plate 4, film 5, carrier plate 6 and heating plate 7 are constituents of a combined injection-moulding method, which will be discussed in more detail below.

As a further component of the cover element 1, a circuit-board ring 8 may be seen. The entire component is closed by the annular housing base 2.

In order to represent an emblem in the cover element, the film 5 and the carrier plate 6 may comprise a geometrically multidimensional structure, that is to say a two-dimensional or three-dimensional structure. Extended configuration options are therefore possible independently of the basic coatings.

Figure 2:
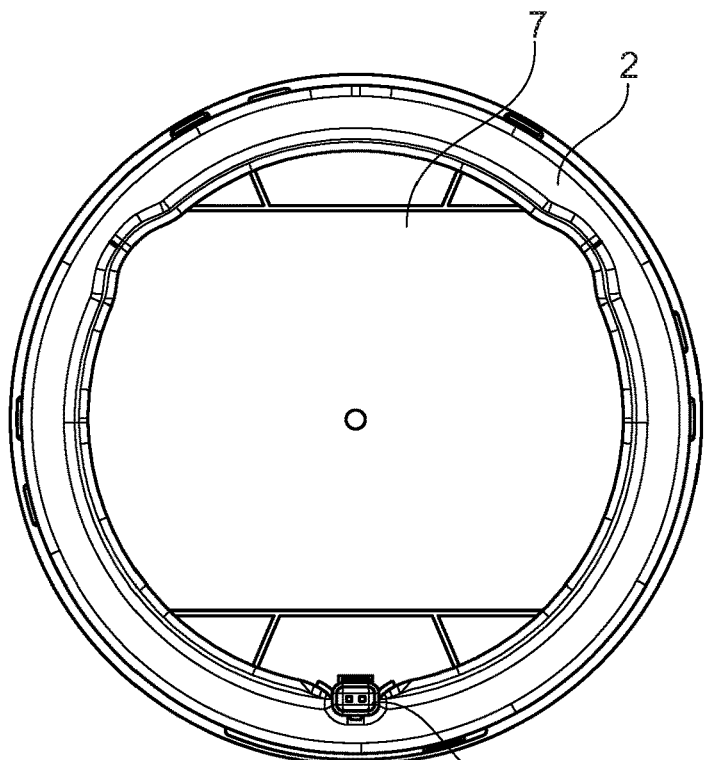
FIG. 2 shows a plan view of the side of the cover element lying in the vehicle interior.

FIG. 2 represents a view of the cover element 1 from the interior of the vehicle. The rear side of the heating plate 7 may in this case be seen. The horizontal lines, which intersect the circular heating plate as secants, define an inner surface which is intended for unperturbed transmission of the radar beams.

At one location of the housing base 2, a cutout through which a plug 8a is fed out from the circuit-board ring 8 is provided.

Figure 4:
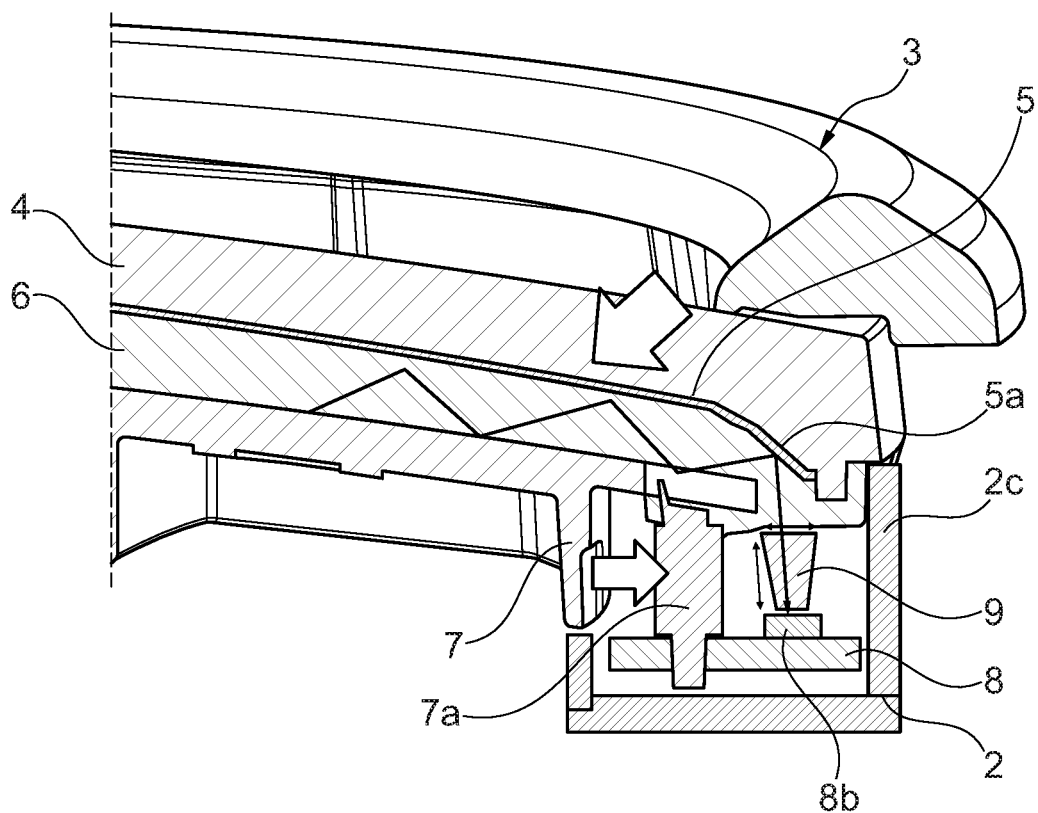
FIG. 4 shows a sectional representation through the edge of the cover element.
Figure 6:
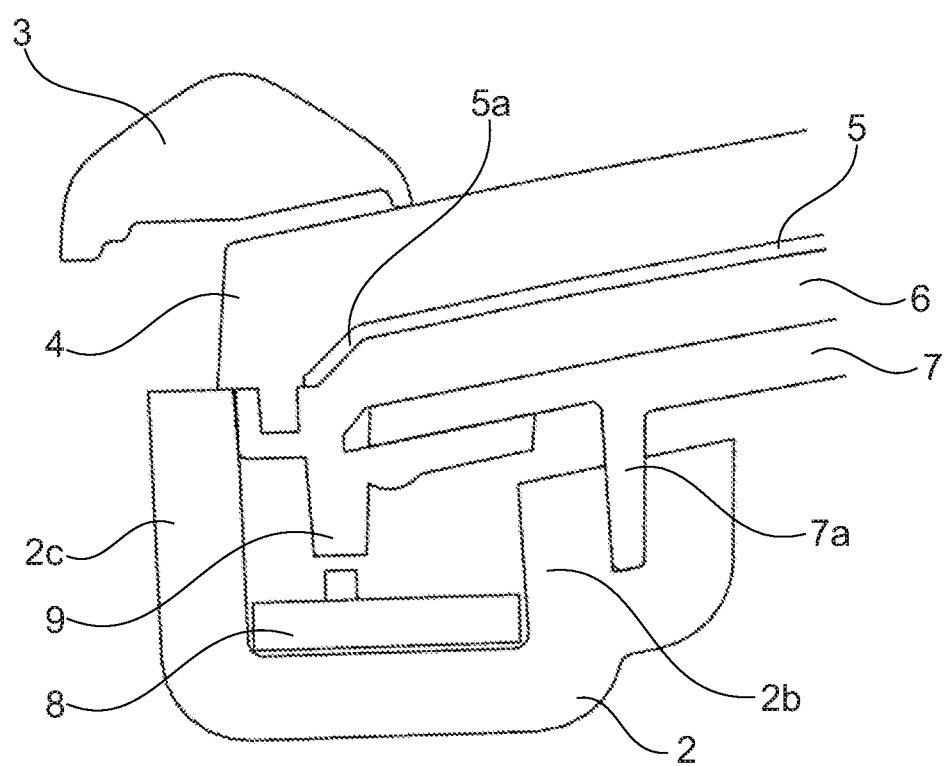
FIG. 6 shows a cross section through the edge region.

FIG. 4 and FIG. 6 represent a section through an edge region of the cover element 1. The construction of the individual component parts may be seen, starting with the housing front 3, the front plate 4, the film 5 and the carrier plate 6. The heating plate 7 comprises pins 7a, which are arranged distributed along the outer edge of the heating plate 7. These pins 7a engage in recesses of the circuit-board ring 8 and are suitably connected to the circuit-board ring. As an alternative thereto, the pins 7a may also extend through the circuit-board ring 8 as far as the housing base 2 and be connected there. For example, the connection is carried out by ultrasonic riveting. On the circuit-board ring 8, LEDs 8b are distributed along the edge of the circuit-board ring 8. The circuit-board ring 8 is held in the housing base 2. The LEDs respectively shine through an optical unit 9 into the carrier plate 6, which extends above the circuit-board ring 8 as far as the outer wall of the housing base 2, i.e. a side-wall 2c. The light of the LEDs is totally internally reflected at the film 5 and at the surface of the heating plate 7. The light is thus distributed along the carrier plate 6. A part of the light, which does not impinge on the film 5, is emitted as scattered light into the front plate, where it is then deflected at the surface by total internal reflection. The scattered light, however, lies in the region of the annular housing front, which shields this region and thus makes scattered light invisible on the outside.

In the region of the direct beam path of the LEDs, the film 5 has an inclined face 5a which optimizes the introduction. An angle of inclination of 45° which the face 5a has when bending away from the plane of the film 5 is in this case optimal.

Since the light which is introduced travels by total internal reflection along the carrier plate 6, precautions must be taken so that the light can actually emerge outwards.

Either the coating or paint or metallization of the heating plate 7, which reduces the effect of the total internal reflection suitably over the entire surface, or in the sections which correspond to an emblem, is used for this.

Figure 5:
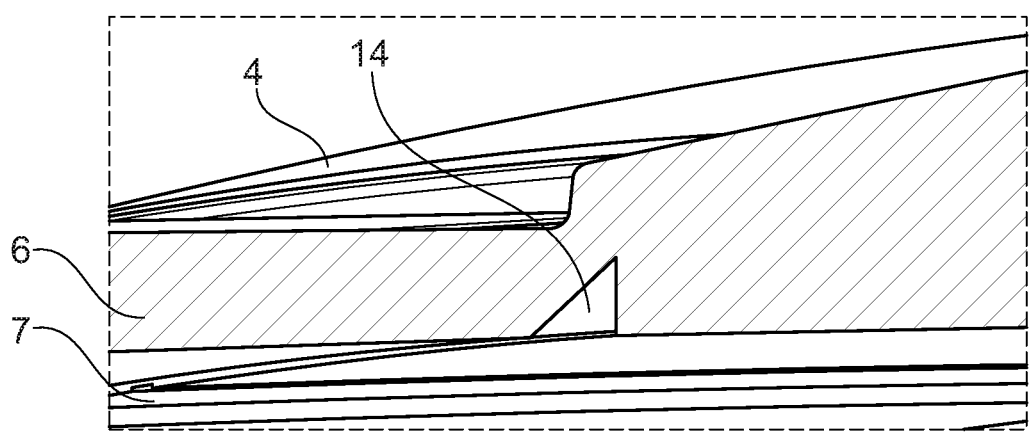
FIG. 5 shows a cross section.

FIG. 5 shows an alternative option for outputting light from the carrier plate. To this end, ribs 14 are formed on the heating plate 7. The ribs are formed below a structure that represents an emblem, so that a particularly large amount of light is output at these locations. The output structures are in this case ribs with a different shape and extent as well as groupings of ribs.

FIG. 6 shows an alternative embodiment. The heating plate 7 is in this case configured in such a way that the pins 7a engage in recesses of the housing base 2. In the housing base 2, the circuit-board ring 8 is embedded between two side-walls 2b and 2c.

The optical unit 9 is a part of the carrier plate 6 which extends as far as the sidewalls 2c of the housing base 2. The film 5 ends with the bent face 5a in the region in which the optical unit 9 extends as a conical appendage of the carrier plate 6.

A further alternative is represented by a circuit-board ring 8 which is adhesively bonded or welded directly to the housing base 2.

Figure 7:
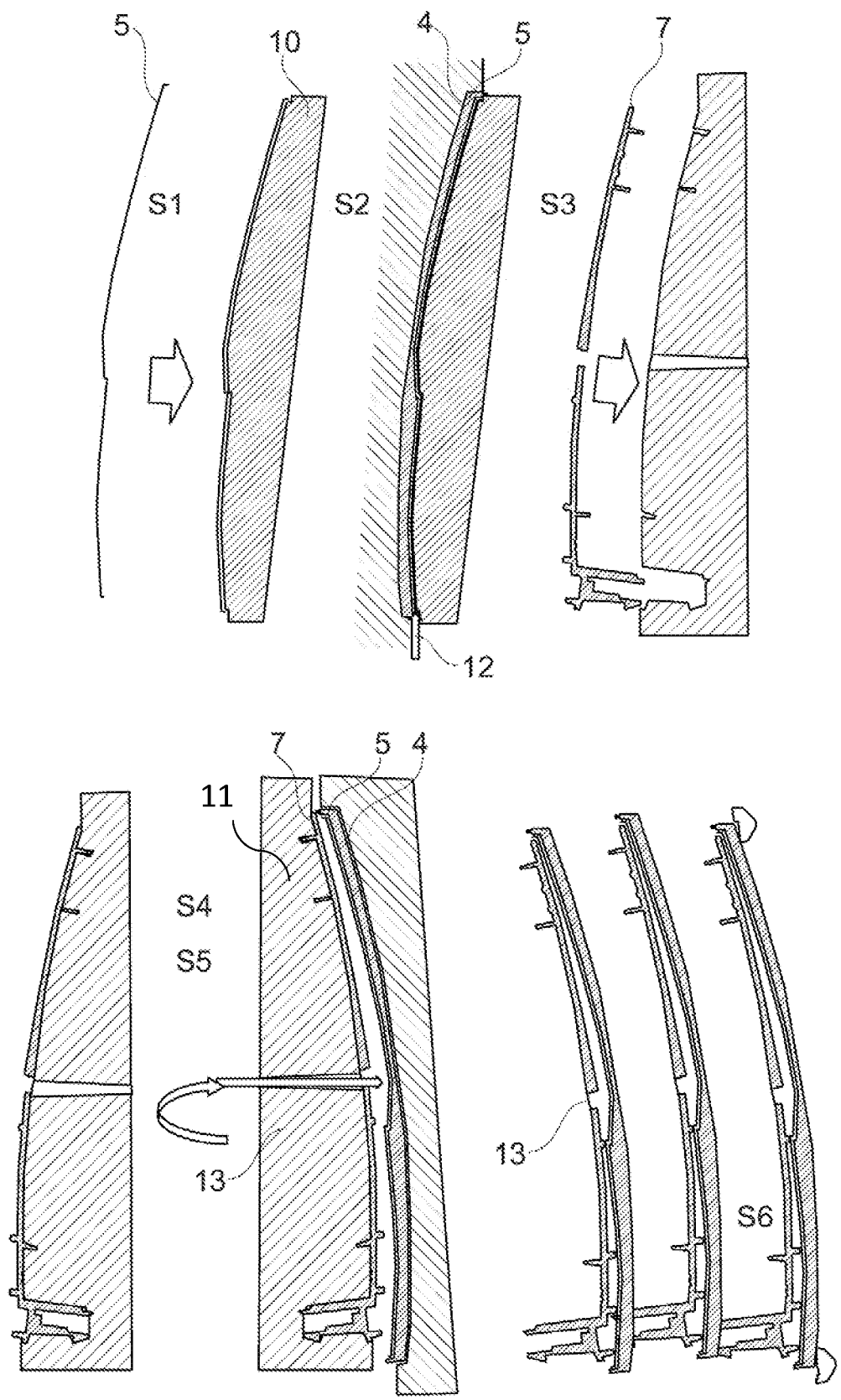
FIG. 7 shows the production steps of the cover element.

FIG. 7 shows the production process in successive steps S1 to S5. The film 5 is produced by a high-pressure forming method and has a two-dimensional or three-dimensional structure. In this method, a plastic film, which is generally decorated by printing on the rear side, is formed and is given the intended contour before it is put into an injection-moulding tool.

In a first step S1, the film 5 is placed in a first tool half of the injection-moulding tool.

In the second step S2, the film is transparently over-moulded and the first component part is thus produced as a transparently overmoulded film. The transparent region forms the front plate 4. The gate location 12 of the injection-moulding method lies at the edge of the tool.

In step S3, the heating plate 7 with the heating wire and the contact pins is placed in the second tool half 11 of the injection-moulding tool and the tool is rotated in step S4 so that the injection-moulding can take place from the same side as for the first component part. The heating plate 7 has a central opening which is used as a gate opening 13.

The carrier plate 6 is then injection-moulded in step S5 with a transparent material between the first component part, film 5 plus carrier plate 6, and the heating plate 7.

As a result, a composite of layers with air excluded is obtained. The composite is compact and may be further processed straightforwardly.

In the last step S6, the injection-moulded assembly is hard-lacquered on the front side or immersed in a hard lacquer. In a final step, the housing front 3, configured as a chrome ring, is clipped on.

List Of Reference Numerals

1 cover element
2 housing base
2a slots
2b, 2c side-wall
3 housing front
3a hook
4 front plate
5 film
5a face
6 carrier plate
7 heating plate
7a pin
8 circuit-board ring
8a plug
8b LED
9 optical unit
10 first tool half
11 second tool half
12 peripheral gate
13 central gate
14 rib

What is claimed is:

1. A cover element for a sensor, the cover element comprising:
    a film;
    a front plate overmoulded over the film;
    a carrier plate overlying the film opposite the front plate;
    the carrier plate overmoulded over a heating plate, the heating plate on an opposite side of the carrier plate as the front plate;
    a circuit-board ring connected to the heating plate opposite the carrier plate, the circuit-board ring including LEDs and plugs;
    an annular housing base supporting the circuit-board ring; and
    an annular housing front overlying the front plate opposite the film and coupled with the annular housing base;
    a hard-lacquer coating applied to at least one of the annular housing base and the annular housing front.

2. The cover element according to claim 1, wherein light of the LEDs is introduced into the carrier plate by means of an optical unit.

3. The cover element according to claim 2, wherein the optical unit is part of the carrier plate.

4. The cover element according to claim 2, wherein the optical unit is a cone which extends from the carrier plate towards the LEDs.

5. The cover element according to claim 2, wherein the film extends towards the optical unit in the region of the optical unit at an angle relative to a plane of the film.

6. The cover element according to claim 1, wherein light from the LEDs is guided between the film and an upper side of the heating plate.

7. The cover element according to claim 1, wherein light from the LEDs is output through the film and the front plate by way of a material of the upper side of the heating plate or by geometrical structures on the heating plate.

8. The cover element according to claim 1, wherein the heating plate is fastened by means of pins in recesses of the circuit-board ring or in sockets of the housing base.

9. The cover element according to claim 1, wherein the heating plate is fastened by means of pins in recesses of the circuit-board ring or in sockets of the housing base.

10. A method for producing a cover element, including:
    placing a film in a first tool half of an injection-moulding tool;
    transparently overmoulding the film to produce a front plate;
    placing a heating plate in a second tool half of the injection-moulding tool;
    rotating the second tool half of the injection-moulding tool such that the front plate overlies the heating plate;
    overmoulding the heating plate with a transparent material of a carrier plate between the front plate and the heating plate to form an injection-moulded assembly; and
    hard-lacquering the injection-moulded assembly or immersing the injection-moulded assembly in a hard lacquer.

11. A cover element for a radar sensor for a vehicle, the cover element comprising:
    a film extending along a plane;
    a front plate overmoulded over the film;
    a carrier plate overlying the film opposite the front plate;
    the carrier plate overmoulded over a heating plate, the heating plate on an opposite side of the carrier plate as the front plate;
    a plurality of ribs extending from the heating plate into the carrier plate;
    a circuit-board ring connected to the heating plate opposite the carrier plate, the circuit-board ring including LEDs and plugs;
    an annular housing base supporting the circuit-board ring; and
    an annular housing front overlying the front plate opposite the film and coupled with the annular housing base such that the housing front and housing base encapsulate the film, front plate, carrier plate and circuit board ring.

12. The cover element according to claim 11, wherein light of the LEDs is introduced into the carrier plate by means of an optical unit.

13. The cover element according to claim 12, wherein the optical unit is part of the carrier plate.

14. The cover element according to claim 12, wherein the optical unit is a cone which extends from the carrier plate towards the LEDs.

15. The cover element according to claim 12, wherein the film extends towards the optical unit in the region of the optical unit at an angle relative to the plane of the film.

16. The cover element according to claim 11, wherein light from the LEDs is guided between the film and an upper side of the heating plate.

17. The cover element according to claim 11, wherein light from the LEDs is output through the film and the front plate by way of a material of the upper side of the heating plate or by geometrical structures on the heating plate.

* * * * *